United States Patent Office 3,101,350
Patented Aug. 20, 1963

3,101,350
OPTIONALLY 17-ALKYLATED 2-OXA-5α-ANDRO-STANE-3β,17β-DIOLS, ETHERS AND ESTERS THEREOF
Raphael Pappo, Skokie, Ill., assignor to G. D. Searle & Co., Chicago, Ill., a corporation of Delaware
No Drawing. Filed Sept. 14, 1962, Ser. No. 223,827
12 Claims. (Cl. 260—345.2)

The present invention pertains to novel steroids characterized by a hemiacetal ring structure and to the ethers and esters derived therefrom. These organic substances are represented, more particularly, by the structural formula

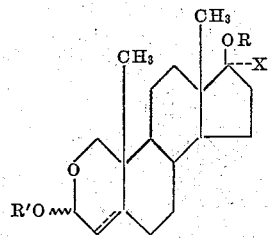

wherein R can be hydrogen or a lower alkanoyl radical, R′ is hydrogen, a lower alkyl or lower alkanoyl radical, X is hydrogen or a lower alkyl radical, the dotted line indicates the optional presence of a 4,5-double bond, and the wavy line indicates the alternative "α" or "β" configuration at carbon atom 3.

The lower alkanoyl radicals encompassed by R and R′ are, typically, formyl, acetyl, propionyl, butyryl, valeryl, caproyl, and the branched-chain isomers thereof. Examples of lower alkyl radicals symbolized by the R and X terms are methyl, ethyl, propyl, butyl, pentyl, hexyl, and the branched-chain radicals isomeric therewith.

The compounds of the present invention are conveniently manufactured by utilizing starting materials of the structural formula

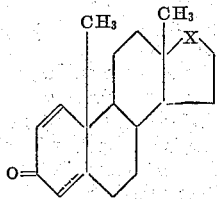

wherein X is a carbonyl, β-hydroxymethylene, or α-(lower alkyl)-β-hydroxymethylene group, and the dotted line indicates the optional presence of a 4,5-double bond. The reaction of these materials with a suitable oxidizing agent such as lead tetracetate or an alkali metal periodate, in the presence of osmium tetroxide, results in cleavage of the 1,2-double bond to produce the corresponding 1,2-seco-A-nor compounds, as represented by the structural formula

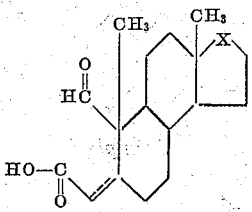

wherein X has the identical meanings designated supra. These 1,2-seco-A-nor compounds are converted to the corresponding 2-oxa-3-ones by reaction with a suitable reducing agent. The latter lactones surprisingly can be partially reduced by means of a selective reagent such as diborane or a dialkylborane, resulting in the instant optionally 17-alkylated 2-oxa-3,17β-diols. The latter processes are specifically illustrated by the reaction of 17β hydroxy-17α-methyl-5α-androst-1-en-3 - one in aqueous acetic acid with lead tetracetate and osmium tetroxide to afford 17β - hydroxy-17α-methyl-1-oxo-1,2-seco-A-nor-5α-androstan-2-oic acid, reaction of that substance with sodium borohydride in aqueous sodium hydroxide to yield 17β - hydroxy-17α-methyl-2-oxa-5α-androstan-3-one, and partial reduction of the latter lactone with diborane to afford a mixture of 17α-methyl-2-oxa-5α-androstane-3β, 17β-diol and the corresponding 3α,17β-epimeric diol. These epimers are separated by fractional crystallization.

Esters of the above-described 3,17β-diols are obtained by reaction of the latter substances with a suitable acylating agent, i.e., an alkanoyl halide or alkanoic acid anhydride, in the presence of a suitable acid acceptor, for example pyridine or triethylamine. This process is exemplified by the reaction of the aforementioned 2-oxa-5α-androstane-3β,17β-diol with acetic anhydride and pyridine at room temperature to yield 2-oxa-5α-androstane-3β,17β-diol 3,17-diacetate. The instant 17-alkyl-3,17β-diols, on the other hand, yield the corresponding 3-monoesters when subjected to that procedure. When an elevated temperature is used, however, the 17α-alkyl-3,17β-diol 3,17-diesters are produced.

The unusually reactive hemiacetal hydroxy group at the 3-position will react with a lower alkanol under mild conditions, e.g., in the presence of an acidic catalyst at room temperature, to produce the 3-(lower alkoxy) compounds of the present invention. Typically, 17α-methyl-2-oxa-5α-androstane-3β,17β-diol is contacted with methanol in the presence of p-toluene-sulfonic acid to afford 17α - methyl - 2-oxa-5α-androstane-3β,17β-diol 3-methyl ether.

The compounds of this invention are useful in view of their valuable pharmacological properties. They are, for example, anabolic agents which possess the particular advantage of lacking potent androgenic side-effects.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.), and quantities of materials are expressed in parts by weight unless otherwise noted.

*Example 1*

To a solution of 8 parts of 5α-androst-1-ene-3,17-dione and 120 parts of acetic acid containing 15 parts of water is added 50 parts of lead tetracetate and 0.75 part of osmium tetroxide. This reaction mixture is stirred for about 4 hours at room temperature, then is stored at room temperature for about 16 hours, and finally is extracted with benzene. The benzene solution is washed with water, and extracted with aqueous potassium bicarbonate. The aqueous extracts are acidified with dilute hydrochloric acid, then are extracted with a mixture of ethyl acetate and benzene. This organic extract is washed with water, dried over anhydrous sodium sulfate, and evaporated to dryness at reduced pressure. The resulting residue is dissolved in 20 parts of pyridine, then is treated with 10 parts of 20% aqueous sodium bisulfite. This mixture is stirred for about 20 minutes at room temperature, then is diluted with water and extracted with ethyl acetate. The aqueous layer is separated and acidified by means of dilute sulfuric acid, and this acidic mixture is then extracted with benzene. The benzene extract is washed with water, dried over anhydrous sodium sulfate, and concentrated to dryness in vacuo to afford 1,17-dioxo-1,2-seco-A-nor-5α-androstan-2-oic acid.

To a solution of 2 parts of 1,17-dioxo-1,2-seco-A-nor-5α-androstan-2-oic acid in 20 parts of water containing 4 parts of 20% aqueous sodium hydroxide is added a solution of 10 parts of sodium borohydride in 80 parts of water. This mixture is stored at room temperature for about 24 hours, then is washed with ether and acidified with aqueous hydrochloric acid. The resulting mixture is extracted with ethyl acetate-ether, and the organic layer is separated, washed successively with aqueous potassium carbonate and water, dried over anhydrous sodium sulfate, then evaporated to dryness at reduced pressure. The crystalline residue is triturated with ether, then is recrystallized from butanone to afford pure 17β-hydroxy-2-oxa-5α-androstan-3-one, melting at about 198–203°.

*Example 2*

To a solution of 6.36 parts of 17β-hydroxy-17α-methyl-5α-androst-1-en-3-one in 95 parts of acetic acid containing 12 parts of water is added 40 parts of lead tetracetate and 0.6 part of osmium tetroxide. This reaction mixture is then stored at room temperature for about 24 hours, after which time 2 parts of lead tetraacetate are added. Evaporation to dryness at reduced pressure affords a residue which is extracted with benzene. The benzene extract is washed with water, then is extracted with aqueous potassium bicarbonate. This aqueous extract is washed with ether, acidified by means of dilute sulfuric acid, then is extracted with a mixture of ethyl acetate and benzene. The resulting organic extract is washed with water, dried over anhydrous sodium sulfate, and concentrated to dryness at reduced pressure. To a solution of the residual crude product in 20 parts of pyridine is added 10 parts of 20% aqueous sodium bisulfite, and this mixture is stirred for about 20 minutes at room temperature, then is diluted with water, washed with ethyl acetate, acidified with dilute sulfuric acid, and finally extracted with benzene. This benzene solution is washed with water, dried over anhydrous sodium sulfate, and evaporated to dryness at reduced pressure to produce crude 17β-hydroxy - 17α - methyl - 1 - oxo - 1,2 - seco - A - nor - 5α-androstan-2-oic acid, melting at about 166–173° (dec.) after recrystallization from aqueous isopropyl alcohol.

An aqueous slurry of 6 parts of 17β-hydroxy-17α-methyl-1-oxo-1,2-seco-A-nor-5α-androstan-2-oic acid with 200 parts of water is made alkaline to pH 10 by the addition of dilute aqueous sodium hydroxide, then is contacted with 6 parts of sodium borohydride. The resulting reaction mixture is allowed to stand at room temperature for about 3 hours, then is diluted with benzene and acidified carefully by means of dilute hydrochloric acid. The organic layer is then separated and the aqueous layer is extracted with benzene. The combined benzene extracts are washed successively with aqueous potassium bicarbonate and water, dried over anhydrous sodium sulfate, then evaporated to dryness at reduced pressure. The resulting residue is triturated with ether to afford pure 17β-hydroxy-17α-methyl-2-oxa-5α-androstan-3-one, melting at about 235–238° and characterized further by an optical rotation of −23° in chloroform.

*Example 3*

By substituting 6.65 parts of 17α-ethyl-17β-hydroxy-5α-androst-1-en-3-one and otherwise proceeding according to the procedure described in Example 2, 17α-ethyl-17β-hydroxy-1-oxo-1,2-seco-A-nor-5α-androstan-2-oic acid and 17α-ethyl-17β-hydroxy-2-oxa-5α-androstan-3-one, melting at about 192–195°, are obtained.

*Example 4*

Into a suspension of 10 parts of 17β-hydroxy-17α-methyl-2-oxa-5α-androstan-3-one in 222 parts of tetrahydrofuran is bubbled a stream of nitrogen containing diborane, generated by the addition of a solution of 13 parts of sodium borohydride in 143 parts of diethyleneglycol dimethyl ether to a solution of 45 parts by volume of boron trifluoride etherate in 143 parts of diethyleneglycol dimethyl ether. The addition of diborane is continued with stirring for about 1½ hours, at the end of which time the mixture is cooled to 0–5° and diluted carefully with about 50 parts of water. After the evolution of hydrogen ceases, the mixture is stripped of solvent at reduced pressure, and the residue is extracted with chloroform. The chloroform layer is washed successively with aqueous sodium hydroxide and water, then is concentrated to dryness at reduced pressure. Recrystallization of this residue, first from aqueous acetone then from acetone, affords prism-like crystals of 17α-methyl-2-oxa-5α-androstane-3β,17β-diol, which is characterized by a double melting point at 107–112° (dec.) and 168–170°. This compound is represented by the structural formula

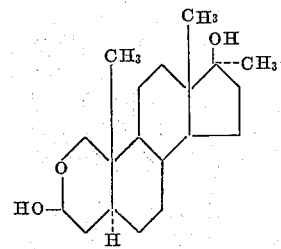

*Example 5*

Into a solution of 18.6 parts of 2-methyl-2-butene in 190 parts of diethyleneglycol dimethyl ether, at 0–5° in an atmosphere of nitrogen, is passed a stream of diborane, generated by the reaction of 4 parts of sodium borohydride with 18.8 parts of boron trifluoride etherate. After the reaction mixture is stirred at this temperature for about 3 hours, 10 parts of 17β-hydroxy-2-oxa-5α-androstan-3-one is added portionwise, and stirring is continued for several minutes until the mixture becomes homogeneous, at which time it is allowed to stand at that temperature for about 16 hours. The mixture is then diluted with 50 parts of water containing 5 parts of sodium hydroxide, then is treated dropwise with 40 parts of cold 30% hydrogen peroxide at a temperature of 5–15°. Extraction of this aqueous mixture with chloroform affords an organic solution which is washed successively with water, 10% aqueous sodium sulfite, aqueous sodium hydroxide, and water, then is dried over anhydrous sodium sulfate and is stripped of solvent at reduced pressure. The resulting residue is extracted with ether, and the ether solution is stirred with water for about 2 hours. The crystalline precipitate which forms is collected by filtration and recrystallized from acetone to afford prism-like crystals of 2-oxa-5α-androstane-3β,17β-diol, which melts at about 189–190° and is characterized further by the structural formula

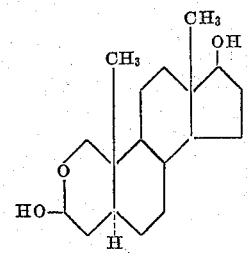

*Example 6*

By substituting 10.44 parts of 17α-ethyl-17β-hydroxy-2-oxa-5α-androstan-3-one and otherwise proceeding according to the procedure described in Example 4, 17α-ethyl-2-oxa-5α-androstane-3β,17β-diol is obtained.

*Example 7*

A mixture of 5 parts of 2-oxa-5α-androstane-3β,17β-diol, 50 parts of acetic anhydride, and 100 parts of pyridine is stored at room temperature for about 16 hours, then is concentrated to dryness at reduced pressure. The resulting residue is crystallized from hexane to yield 2-oxa-5α-androstane-3β,17β-diol 3,17-diacetate, melting at about 143–145°. This compound is represented by the structural formula

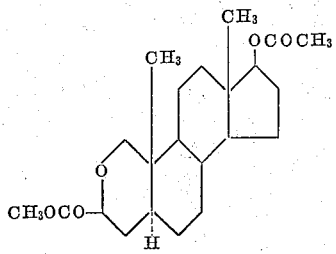

*Example 8*

The substitution of 63.7 parts of propionic anhydride in the procedure of Example 7 results in 2-oxa-5α-androstane-3β,17β-diol 3,17-dipropionate.

*Example 9*

The substitution of 5 parts of 17α-methyl-2-oxa-5α-androstane-3β,17β-diol in the procedure of Example 7 results in 17α-methyl-2-oxa-5α-androstane-3β,17β-diol 3-acetate.

*Example 10*

The reaction of 5.46 parts of 17α-ethyl-2-oxa-5α-androstane-3β,17β-diol with 63.7 parts of propionic anhydride and 100 parts of pyridine according to the process described in Example 7 results in 17α-ethyl-2-oxa-5α-androstane-3β,17β-diol 3-propionate.

*Example 11*

To a solution of 5 parts of 17α-methyl-2-oxa-5α-androstane-3β,17β-diol in 400 parts of methanol is added 2 parts of p-toluenesulfonic acid monohydrate, and this reaction mixture is kept at room temperature for about 15 minutes, then is made alkaline by the addition of aqueous sodium hydroxide. Extraction with benzene affords an organic solution which is concentrated to dryness to afford 17α-methyl-2-oxa-5α-androstane-3β,17β-diol 3-methyl ether as a low melting solid. This substance is represented by the structural formula

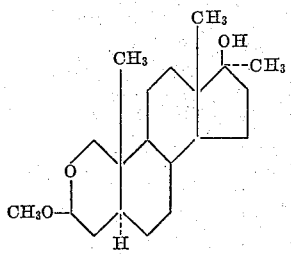

*Example 12*

By substituting 5 parts of 2-oxa-5α-androstane-3β,17β-diol and otherwise proceeding according to the processes described in Example 11, 2-oxa-5α-androstane-3β,17β-diol 3-methyl ether is obtained. It is represented by the structural formula

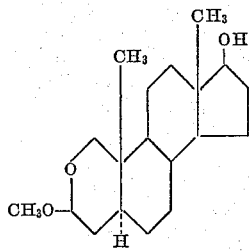

*Example 13*

The reaction of 5 parts of 2-oxa-5α-androstane-3β,17β-diol with 575 parts of ethanol and 2 parts of p-toluenesulfonic acid monhydrate by the procedure described in Example 11 results in 2-oxa-5α-androstane-3β,17β-diol 3-ethyl ether.

*Example 14*

The reaction of 5 parts of 17α-ethyl-2-oxa-5α-androstane-3β,17β-diol with 575 parts of ethanol and 2 parts of p-toluenesulfonic acid monohydrate according to the processes described in Example 11 results in 17α-ethyl-2-oxa-5α-androstane-3β,17β-diol 3-ethyl ether.

*Example 15*

The substitution of 5.24 parts of 2-oxa-5α-androstane-3β,17β-diol 3-methyl ether in the procedure of Example 7 results in 3-methoxy-2-oxa-5α-androstan-17β-ol 17-acetate, represented by the structural formula

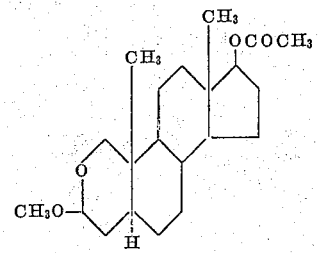

What is claimed is:
1. A compound of the structural formula

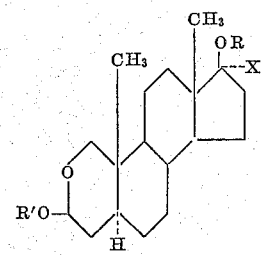

wherein R is selected from the group consisting of hydrogen and lower alkanoyl radicals, R' is selected from the group consisting of hydrogen, lower alkyl, and lower alkanoyl radicals, and X is selected from the group consisting of hydrogen and lower alkyl radicals.
2. 2-oxa-5α-androstane-3β,17β-diol.
3. A compound of the structural formula

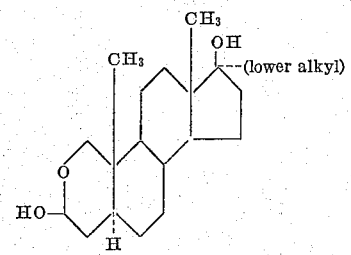

4. 17α-methyl-2-oxa-5α-androstane-3β,17β-diol.
5. A compound of the structural formula

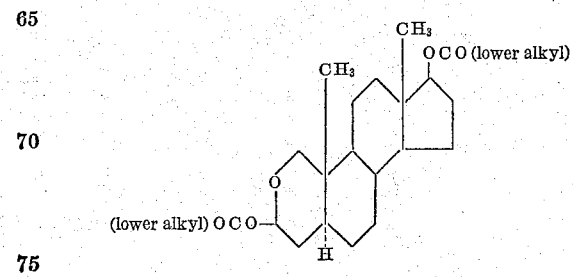

6. 2-oxa-5α-androstane-3β,17β-diol 3,17-diacetate.
7. A compound of the structural formula
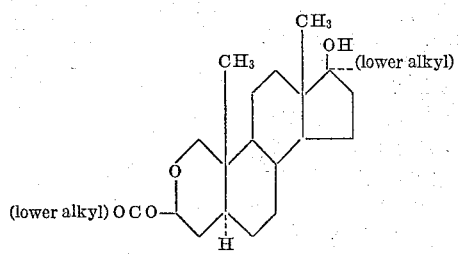
8. 17α-methyl-2-oxa-5α-androstane-3β,17β-diol 3-acetate.
9. A compound of the structural formula
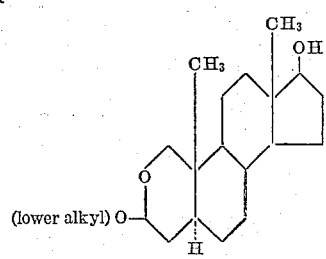
10. 2-oxa-5α-androstane-3β,17β-diol 3-methyl ether.
11. A compound of the structural formula
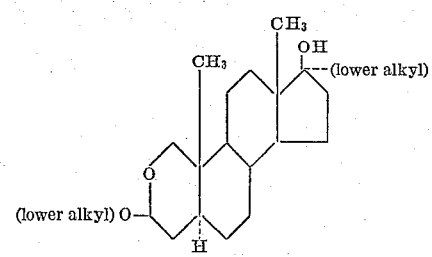
12. 17α - methyl - 2 - oxa - 5α - androstane - 3β,17β-diol 3-methyl ether.
No references cited.